United States Patent [19]
Salyer et al.

[11] 3,799,356
[45] Mar. 26, 1974

[54] DIALYSIS HOLLOW FIBER MEMBRANES AND MANUFACTURE

[75] Inventors: Ival O. Salyer, Dayton, Ohio; James S. Tapp, Decatur, Ala.; William E. Weesner, Alexandria, Va.; Richard L. Leonard, Cary, N.C.

[73] Assignee: The United States of America as represented by the Secretary of Health, Education and Welfare, Washington, D.C.

[22] Filed: Dec. 28, 1970

[21] Appl. No.: 102,132

[52] U.S. Cl.................. 210/500, 264/182, 264/206
[51] Int. Cl............................................. B01d 31/00
[58] Field of Search .............. 210/22, 23, 321, 500; 264/41, 49, 182, 206

[56] References Cited
UNITED STATES PATENTS
| | | | |
|---|---|---|---|
| 3,674,628 | 7/1972 | Fabre | 210/321 X |
| 3,423,491 | 1/1969 | McLain et al. | 264/49 |
| 2,593,540 | 4/1952 | Cornwell et al. | 210/23 |
| 3,546,209 | 12/1970 | Lipps, Jr. | 210/321 X |

OTHER PUBLICATIONS

Leininger, et al., "Preparation of Hunthrumbogenic Plastic Surfaces," from Trans. Amer. Soc. Artif. Int. Organs., Vol. XII, Received in Patent Office July 6, 1966, pp. 151–154.

*Primary Examiner*—Frank A. Spear, Jr.

[57] ABSTRACT

Non-thrombogenic hemodialysis hollow fiber membranes useful in artificial kidneys are prepared from quaternized hollow fiber membranes of polymers made from monomeric substances of which at least a sufficient amount of a vinylpyridine is included to provide membranes which on heparinization are non-thrombogenic, particularly polymers made from monomeric substances of which from 2 to 10 percent by weight of the total monomer is a vinylpyridine and at least 80 percent by weight is acrylonitrile. Both copolymers and blends of polymers can be used. A novel process is described for making the quaternized hollow fiber membranes and preserving the porosity of the membranes.

17 Claims, No Drawings

DIALYSIS HOLLOW FIBER MEMBRANES AND MANUFACTURE

CROSS-REFERENCE TO RELATED APPLICATIONS

Copending application Ser. No. 107,719, now U.S. Pat. No. 3,698,560, of even date describes and claims a disposable cartridge hollow fiber hemodialyzer which can use the hollow fiber membranes of this application.

BACKGROUND OF THE INVENTION

The invention described herein was made in the course of, or under, a contract with the Department of Health, Education, and Welfare.

1. Field of the Invention

The invention relates to liquid purification and separation, and especially to semi-permeable membranes and is useful in the dialysis art and especially in the hemodialysis or artificial kidney art.

2. Description of the Prior Art

Non-thrombogenic, permeable hollow fiber membranes useful for artificial kidneys are described in U.S. Pat. No. 3,441,142. The non-thrombogenic hollow fiber membranes of this patent are made from hollow fiber membranes having hydroxyl groups by converting at least a portion of the hydroxyl groups to oxy alkali metal groups, then reacting with a haloalkyl dialkyl amine, then quaternizing by reacting with an alkyl halide and finally reacting with an alkali metal salt of an anti-thrombogenic compound such as heparin.

SUMMARY OF THE INVENTION

Non-thrombogenic hemodialysis hollow fiber membranes useful in artificial kidneys are prepared from quaternized hollow fiber membranes of polymers of monomeric substances of which at least a sufficient amount of a vinylpyridine is included to provide membranes which on heparinization are non-thrombogenic, particularly polymers made from monomeric substances of which from 2 percent to 10 percent by weight of the total monomer is a vinylpyridine and at least 80 percent is acrylonitrile. It should be noted that all percentages in this application including the claims are by weight unless otherwise stated. Both copolymers and blends of polymers can be used. A novel process is described for making the quaternized hollow fiber membranes and preserving the porosity of these hollow fiber membranes. Copolymer blends of acrylonitrile and methyl/vinylpyridine copolymer with copolymers of acrylonitrile and vinyl acetate are especially suitable.

DESCRIPTION OF THE PREFERRED EMBODIMENTS

Copolymers and copolymer blends of acrylonitrile and a vinylpyridine together with minor proportions of other comonomers polymerizable therewith are described in U.S. Pat. No. 2,613,194; however, it is not necessary to use sulfuric acid as the patent does to make the quaternized hollow fibers of the present invention. As has been stated, useful polymers are both blends and copolymers per se which are comprised of at least a sufficient amount of a vinylpyridine in the monomer mixture to give a quaternized membrane which when heparinized is non-thrombogenic based on in vitro or in vivo tests accepted in the art, e.g. a test comparable to that described in copending application Ser. No. 39,858, filed May 20, 1970, now U.S. Pat. No. 3,655,815 issued April 11, 1972 Example 2, page 9 et seq; particularly the blends and copolymers per se are comprised of from 2 to 10 percent of a vinylpyridine including alkyl-substituted vinylpyridines, said percentage being based on the total monomers of which the copolymer or blend of copolymers are comprised. The preferred blends can have as a principal polymer from 50 to 98 percent of a copolymer of 90 percent or more acrylonitrile and minor proportions of monomers copolymerizable therewith. The other blend constituent is a polyvinyl pyridine of a copolymer of 30 or more percent up to 70 percent of a vinylpyridine and up to 70 percent of another copolymerizable monomer. The two components of the blended copolymers are proportioned such as to provide the required quantity of acrylonitrile and reactive vinylpyridine. Although copolymer blends are especially suitable a copolymer per se of acrylonitrile and a vinylpyridine having at least about 50 percent acrylonitrile therein, particularly a copolymer of 90 to 98 percent acrylonitrile and from 2 to 10 percent of a vinylpyridine can be used.

The vinylpyridine in both the copolymers and blend copolymers can be any vinylpyridine or alkylsubstituted vinylpyridine, for example, 2-vinylpyridine, 3-vinylpyridine, 4-vinylpyridine, 2-vinyl-4-ethylpyridine, 2-vinyl-3-methylpyridine, 5-vinyl-2-methylpyridine, 2-vinyl-5-ethylpyridine, 2-vinyl-4-methylpyridine, 3-vinyl-5-ethylpyridine and any other vinylpyridine containing alkyl substituents wherein the alkyl radical has up to four carbon atoms.

The copolymers can have in addition to the functional components, acrylonitrile and a vinylpyridine, one or more other components derived from monomers such as vinyl acetate and other vinyl esters of carboxylic acid having up to four carbon atoms, vinyl chloroacetate, methyl methacrylate, methyl acrylate and other alkyl acrylates and alkyl methacrylates wherein the alkyl radical has up to four carbon atoms, diethyl maleate, diethyl fumarate and other alkyl maleates and fumarates wherein the alkyl radical has up to four carbon atoms, styrene and other vinyl-substituted aromatic hydrocarbons, vinylidene chloride and methacrylonitrile. These nonfunctional monomers can be present as a third monomer with acrylonitrile and a vinylpyridine in a terpolymeric system, or they can be used in the blended composition either as a comonomer with acrylonitrile in the principal polymer or as a comonomer with a vinylpyridine in the blending polymer.

Suitable quaternizing agents are alkyl halides such as methyl bromide, methyl chloride, methyl iodide, ethyl bromide, etc. Others that may be employed include straight and branch chained primary alkyl, alkenyl, cycloalkyl alkyl, and aralkyl chlorides, bromides and iodides having from one to about 10 carbon atoms in the molecule, e.g. benzyl chloride. All of the above-named halides are aliphatic halides and are so defined.

A preferred solvent is N,N-dimethylacetamide since it is very suitable as a spinning solvent but other solvents such as the following may be used to prepare the copolymer blends, namely butyrolactone, N,N-dimethylformamide, ethylene carbonate, maleic anhydride, N,N-dimethyl methoxy acetamide, succinic anyhydride, dimethyl sulfoxide and α-cyanoacetamide.

A particularly suitable copolymer blend for use in making the hollow fiber membranes of the invention is a blend of a 95 percent acrylonitrile and 5 percent vinyl acetate copolymer with a 50 percent acrylonitrile and 50 percent methyl vinylpyridine copolymer in a ratio of 88:12, respectively, of the copolymers in the blend.

Making the hollow fiber membranes is illustrated in the following example:

Dope: 25 percent Polymer blend in dimethyl acetamide + 0.0633 g.
  Benzyl Chloride/g. of polymer
  Temperature, 120°C.
  Fate, 1.2 cc./min.
Spinnerette: Hollofil 22-12-8 ($OD_o$-$OD_t$-$ID_t$), mils
  Temperature, 70°C.
  Inject Air at 2.0 cm. pressure of Carbowax-400
Air Gap: Spin through 4 inch unheated chimney attached to spinnerette and touching coagulation bath (to control solvent evaporation).
Coagulation Bath: Water at 23°C.
Wash Rolls: Water at 22°C.; 25.5 f.p.m.
Doff Time: 90 minutes (time of collecting fiber on bobbin)

| Bobbin | Fiber Wet, microns OD | ID | Fiber Air Dried, microns OD | ID |
|---|---|---|---|---|
| 1[1] | 440 | 250 | 300 | 180 |
| 2 thru 4 | 450 | 280 | 310 | 210 |

[1]Injection air increased after the first bobbin.

The spinnerette consisted of two hollow concentric cylinders and the air was injected to the central channel of the inner concentric cylinder with the spinning dope being injected to the annular space between the concentric cylinders. Alternatively, quaternization can be carried out subsequent to the formation of the fibers; however, it is preferred to quaternize the polymer before the fibers are formed since under the conditions employed fiber spinning is facilitated by the presence of the benzyl chloride.

Hollow fiber membranes are made having urea permeability in the range of 0.005 to 0.075 cm./min. and ultrafiltration rates in the range of 3 to 300 ml./min./m$^2$ at 25 mm. Hg. transmembrane pressure. Adjusting process conditions such as drying time, quenching conditions, etc. changes urea permeability and ultrafiltration rates and can give permeability and ultrafiltration outside the ranges specified.

Porosity of the hollow fibers is lost if the fibers are allowed to dry out, yet the fibers cannot be successfully potted with epoxy compound into the artificial kidney structure when wet with water, so normally the water on the fiber is exchanged with glycerine ethylene glycol, ethanol or other suitable solvent prior to potting of the fibers, then the potted fibers are washed free of glycerine with water so the fibers can be heparinized. The potting of the hollow fibers and heparinization is described in more detail in the copending application referred to above describing a disposable cartridge hollow fiber hemodialyzer.

Heparinization of the hollow fiber membranes can be carried out as described in U.S. Pat. No. 3,441,142, column 5, line 26 et seq. as well as in the experimental examples of this patent; heparinization can be carried out prior to the formation of the hollow fiber membrane by heparinizing the polymer in solution, but since heparin type materials are so expensive, it is preferred to carry out the heparinization of the hollow fiber membrane itself treating only the membrane surface which will contact blood. The heparinization is carried out on the potted hollow fibers with only the inner surfaces of the hollow fibers being heparinized since these are the only surfaces which will contact the blood.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A hollow fiber asymetric hemodialysis membrane quaternized throughout and formed of a polymer made from monomeric substances of which at least a sufficient amount of a vinylpyridine is included to provide membranes which on heparinization are non-thrombogenic and at least 50% is acrylonitrile.

2. A membrane of claim 1 wherein the urea permeability is in the range of 0.005 to 0.075 cm./min. and the ultrafiltration rate is in the range of 3 to 300 ml./min./m.$^2$ at 25 mm. Hg. transmembrane pressure.

3. A membrane of claim 1 wherein the polymer is a blend of a copolymer of acrylonitrile and vinyl acetate using at least 90 percent acrylonitrile in the monomer mix with a copolymer of methyl vinylpyridine and acrylonitrile using a monomer mix of 30 percent or more methyl vinylpyridine and the balance acrylonitrile.

4. A heparinized membrane of claim 3 useful for hemodialysis.

5. A membrane of claim 3 wherein one copolymer is 95:5 acrylonitrile/vinyl acetate and the other copolymer is 50:50 acrylonitrile/methyl vinylpyridine with the copolymer proportions in the blend being 88:12, respectively.

6. A heparinized membrane of claim 5 useful for hemodialysis.

7. A heparinized membrane of claim 1 useful for hemodialysis.

8. A membrane of claim 7 wherein the urea permeability is in the range of 0.005 to 0.075 cm./min. and the ultrafiltration rate is in the range of 3 to 300 ml./min./m.$^2$ at 25 mm. Hg. transmembrane pressure.

9. A process for making a hemodialysis hollow fiber membrane of claim 1 comprising the following steps:
  a. extruding a spinning dope comprising a polymer made from monomeric substances of which at least a sufficient amount of a vinylpyridine is included to provide membranes which on heparinization are non-thrombogenic and at least 50 percent is acrylonitrile, a solvent for the polymer blend and a quaternizing agent through the annular space of a concentric cylinder spinnerette; and, running a fluid through the center of the inner cylinder of the spinnerette during spinning to aid in maintaining the cylindrical channel of the hollow fiber;
  b. discharging the hollow fiber from the spinnerette into a coagulation bath, the space between the spinnerette and the coagulation bath being enclosed by a chimney to partially air dry the hollow fiber;

c. taking up the fiber from the coagulation bath on rolls to stretch and establish the integrity of the hollow fiber;

d. washing the fiber to remove spinning solvent and excess quaternizing agent; and, e. winding the hollow fiber on a bobbin in a wet condition.

10. A process of claim 9 wherein the solvent is dimethylacetamide.

11. A process of claim 9 wherein the quaternizing agent is an aliphatic halide.

12. A process of claim 11 wherein the quaternizing agent is benzyl chloride.

13. A process of claim 9 wherein the fluid running through the center of the inner cylinder of the spinnerette is air.

14. A process of claim 9 wherein the coagulating bath is water.

15. A process of claim 9 wherein the hollow fiber is washed with water.

16. A method for preserving porosity of fibers during potting comprising exchanging the water of the wet hollow fiber from step (e) of claim 9 with a water soluble liquid.

17. A process of claim 16 wherein the water soluble liquid is glycerine.

* * * * *